Aug. 17, 1926.
S. SAMSON
FISH DIVERTER
Filed March 18, 1926
1,596,310
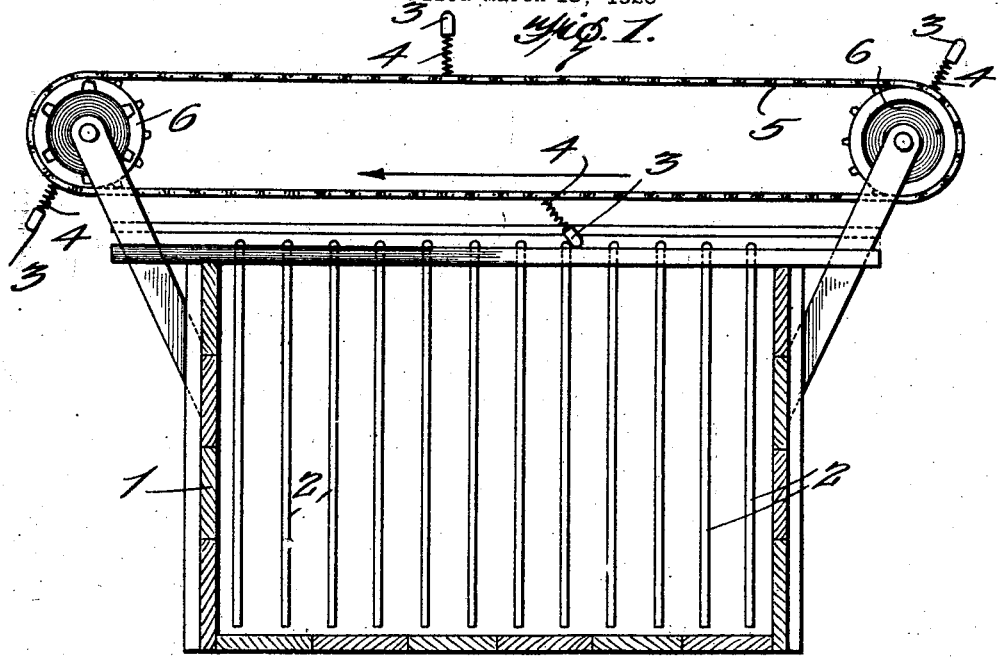
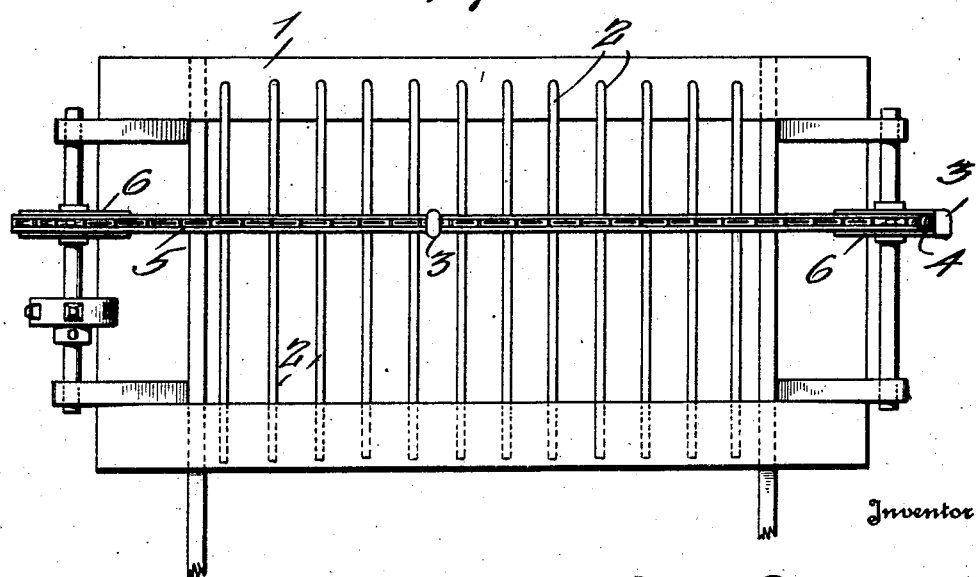
Inventor
SAM SAMSON,
By David E Lofgren
Attorney Patented Aug. 17, 1926.

1,596,310

UNITED STATES PATENT OFFICE.

SAM SAMSON, OF STEVENSON, WASHINGTON.

FISH DIVERTER.

Application filed March 18, 1926. Serial No. 95,758.

This invention relates to an improvement in fish alarms, and is designed primarily for use with power conduits or irrigation flumes with the object of preventing the fish from entering such conduit or flume.

In the use of water for power or irrigation purposes, it is found that the entrance of small fish into the conduit or flume is a matter of serious inconvenience, as it not only destroys the fish but if not removed in the use of the water for power purposes, there is a liability of interfering with the mechanism of the pumping plant, or in the case of irrigation of choking up the screens.

The present invention aims to provide a means for inducing an audible alarm at the gate or entrance to the power conduit or irrigation flume to scare the fish which approach or are drawn to such gate.

The invention is illustrated in the accompanying drawings, in which:

Fig. 1 is a view in elevation showing the improvement.

Fig. 2 is a plan of the same.

The intake 1 for the water for power or irrigation purposes is usually guarded by a gate 2, comprising spaced metallic bars or rods in order to prevent the entrance of undesirable material. It has been found however, that small fish will frequently enter with the water, and in order to prevent such entrance, the metallic bars of the gate are utilized as one member of an alarm, the remaining members of which are clappers 3 carried by spring sections 4 from an endless chain or carrier 5, operating over sprockets or other guide rollers 6. The clappers of which there may be any desired number, are designed to cooperate successively with the respective bars of the gate and thus induce, in accordance with the rigidity of the movement of the clappers across the bars, a more or less continuous rigid series of contact sounds, which by reason of the well known characteristic of the water to convey such sound, will operate effectively to scare fish approaching the gate or being drawn thereto by the incoming water. The rigidity of movement of the carrier or chain 5 will govern the character of the sound, it being possible to provide the clappers 3 in such number and to move the carrier with sufficient rigidity to cause a substantially continuous note.

It is proposed to operate the carrier 5, one or the other of the wheels 6 by the water flowing past the gate, while no particular means is shown to accomplish this result, it is understood that any form of power wheel suitably geared or interconnected to operate one or the other of the rollers 6 is contemplated.

What I claim is:

1. In combination with a flume intake gate made up of spaced bars, of clappers moved in successive contact with the bars to produce an audible alarm, and an endless carrier on which the clappers are supported.

2. In combination with a flume intake gate made up of spaced bars, of clappers moved in successive contact with the bars to produce an audible alarm, and an endless carrier on which the clappers are supported, and means operated by the water at the intake for operating the carrier.

SAM SAMSON.